Dec. 12, 1944.  G. L. HASSLER  2,364,898
ANALYSIS METHOD FOR GEOCHEMICAL EXPLORATION
Filed Sept. 21, 1940
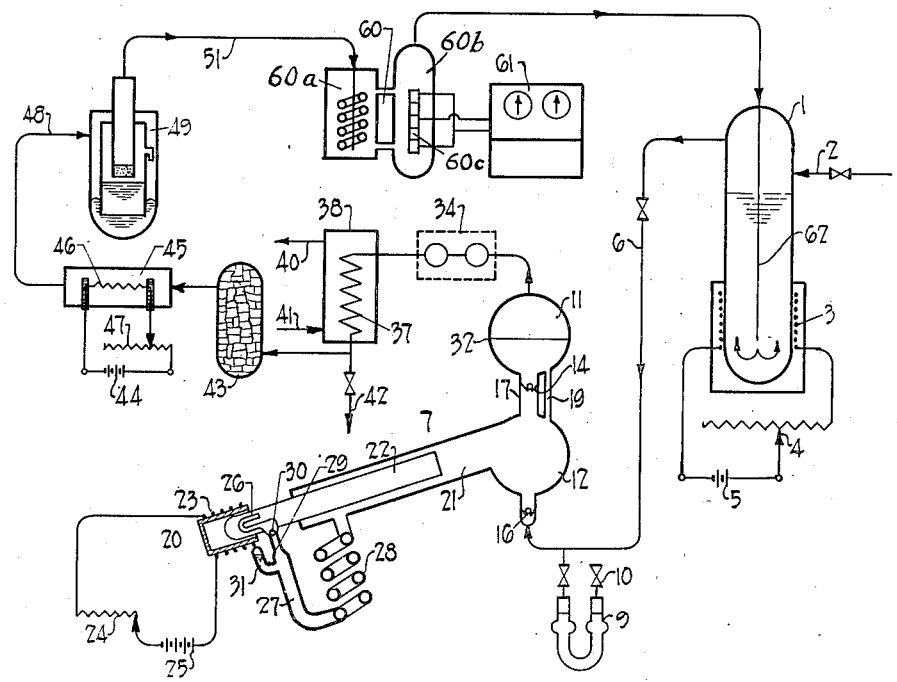
Fig. 1
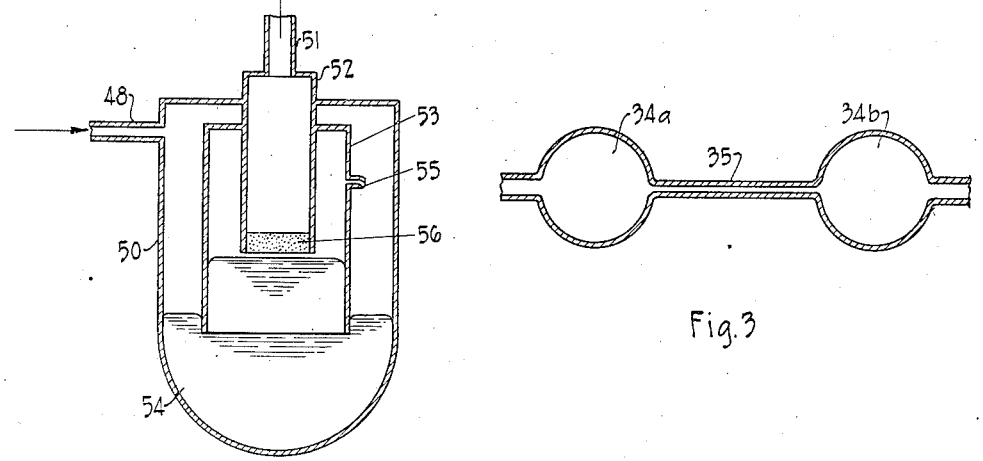
Fig. 2
Fig. 3
Inventor: Gerald L. Hassler
By his Attorney:

Patented Dec. 12, 1944

2,364,898

UNITED STATES PATENT OFFICE 2,364,898

ANALYSIS METHOD FOR GEOCHEMICAL EXPLORATION

Gerald L. Hassler, Berkeley, Calif., assignor to Shell Development Company, San Francisco, Calif., a corporation of Delaware Application September 21, 1940, Serial No. 357,721

2 Claims. (Cl. 23—230)

This invention pertains to a method of exploration for petroleum deposits by means of a systematic study and analysis of soil gas samples, and especially of samples of gas from underground formation waters, and relates more particularly to a system for analyzing said samples.

It is known that indications of the presence of certain substances, such as mineral oil, in or under certain formations may be derived from the analysis of gases drifting upwards to the surface of the ground by diffusion through the surrounding formations.

The exploration of the ground for the presence therein of hydrocarbon gases may be carried out by a systematic analysis of samples of soil gases extracted from the ground either above or below the water table; of soil samples; or of samples of underground formation waters.

In view, however, of the exceedingly small concentrations in which hydrocarbon gases are usually present underground, the application of any of the above methods meets in practice considerable difficulties, chief among which are susceptibility to contamination by impurities or atmospheric air (which may occur either after the sample-taking operation, or before, due, for example, to the "breathing" of the soil), and the adsorption of the significant components of the gas samples on the walls of the analysis apparatus. Further difficulties are encountered when analyzing formation water samples, in effecting a substantially complete separation or extraction of the significant hydrocarbons from the water in which they are dissolved or held.

It is, therefore, an object of the present invention to provide an apparatus for the analysis of gas samples containing exceedingly small concentrations of hydrocarbons, wherein the possibility of contamination is minimized by the use of a closed system, and errors due to adsorption of said hydrocarbons on the walls of the analytical apparatus are eliminated by the use of a continuous process which permits a state of equilibrium to be established before significant measurements are taken, and in which a complete separation of the significant hydrocarbons from the formation water sample wherein said hydrocarbons are held or dissolved is made possible by recirculating the sample through the system for any desired amount of time.

It is also an object of this invention to provide a system equally suitable for the analysis of samples taken either in gaseous or in liquid form, that is, in the form of formation water samples.

It is also an object of this invention to provide a system of analysis of formation waters wherein a complete separation or extraction of hydrocarbons from the aqueous phase is further made possible by the application of suitable pressure and temperature conditions.

It is also an object of this invention to provide an analytical system wherein continuous recirculation is maintained by the use of pumping means arranged in such a manner as to eliminate the possibility of contamination of the sample being analyzed.

It is also an object of this invention to provide suitable control devices for maintaining substantially uniform flow and pressure conditions throughout the present analytical system, substantially as described hereinbelow.

These and further objects of this invention will be understood from the following description taken with reference to the attached drawing, wherein:

Fig. 1 is a diagram schematically showing the arrangement of apparatus forming the present system;

Fig. 2 is a cross-section view of a flow control device used in the system of the present invention; and Fig. 3 is a cross-section view of a flow filter used in the system of the present invention.

Referring to Fig. 1, the analytical system of the present invention comprises a container 1, holding the sample to be analyzed. This sample may be either in gaseous phase, being obtained from the soil, for example, by the method described in my application Serial No. 190,473, filed February 14, 1938, or may consist of formation water, obtained by similar means from the soil preferably at or below the water table and conveyed to container 1 by means of a conduit 2, necessary measures being taken to prevent contamination of said aqueous sample by atmospheric air or impurities.

To separate the soil gases held or dissolved in the formation water sample, use is made of the facts that gases are less soluble in hot water than in cold water, and that they can be withdrawn more rapidly if the heated water is subjected to a continuous washing process at a low vacuum. For this purpose, heat may be applied to the container 1 in any suitable manner, for example, in the form of steam or of a heating electric coil, as shown at 3 in the drawing, suitable control of the temperature being maintained by means of a battery 5 and rheostat 4.

Vacuum or suction is applied to the container 1, or, if the system is used to analyze a sample of formation water, to the space above the water level therein, by means of a conduit 6 and a pump generally indicated at 7. A U-tube 9, partially filled with a liquid, and provided, if desired, with trap bulbs at each end, may be used to indicate that the inlet side of pump 7, which is the point of lowest pressure in the system, is at atmospheric pressure. In this way, it is possible to provide that the pressure within the system will be everywhere else above atmospheric, and to detect any leaks should they occur.

The pump 7 comprises two vertically superimposed reservoirs 11 and 12, communicating with each other by means of a conduit 17, provided with a one-way, upward opening check valve 14. A second similar check valve 16 is interposed between reservoir 12 and the conduit 6. A tubular jacket 21 is in communication with the lower reservoir 12. A tube 22 partially projects inside the tube 21. The outer end of tube 22 is enclosed within a heating element 23, such as an insulated metallic cap 20 wound on the outside with a heating coil to which electric current is supplied through a control rheostat 24 from battery 25. Heat may, however, be supplied to the outer end of tube 22 by any other suitable direct or indirect heating means, such, for example, as a gas burner.

A curved nozzle 26 is inserted within the outer end of tube 22 adjacent that portion thereof subjected to the effect of the heating device 23. The nozzle 26 is in communication, by means of a tube 27, and a cooling coil 28, with the jacket 21. The tube 27 is provided, just below the nozzle 26, with reduced portion 29 and a one-way upward opening valve 30. A tube 31, working as a stabilizing pressure-bell, is in communication with tube 27.

The system of the pump 7, comprising reservoirs 11 and 12, tubes 21, 22 and 27 and coil 28, is filled with distilled water, or other suitable non-contaminating liquid, to a level 32, the check valve 16 preventing said liquid from passing into the conduit 6.

The operation of the pump 7 is as follows:

When heat is applied to the outer end of tube 22 by means of the heating device 23, a portion of the liquid surrounding the nozzle 26 becomes vaporized. The pressure of the expanding steam pocket formed in tube 22 drives the liquid therein towards reservoir 12, thus creating a pressure impulse, and increasing the pressure within reservoir 12. This increase of pressure in reservoir 12 causes the valve 14 to open upwards and a portion of the liquid to pass from reservoir 12 to reservoir 11. As the steam pocket expands along the tube 22, however, it becomes cooled through contact and conduction effects by the relatively large quantities of liquid held in tube 22 and the surrounding jacket 21. This cooling effect starts the condensation of the vapors of the steam pocket and creates a momentary drop of pressure, which causes the valve 30 to open and the nozzle 26 to deliver a jet of liquid from the cooling coil 28 into the tube 22. The complete condensation and collapse of the steam pocket causes a reflux of the liquid from the reservoir 12 in the space formerly occupied by said steam pocket. The resulting fall of pressure within said reservoir causes valve 16 to open, and the gas from conduit 6 to bubble through reservoir 12, whence it is delivered, together with a portion of the liquid, to the reservoir 11 by the next rapidly following pulse of the pump. The liquid forced into the reservoir 11 by each pulse is recirculated back to the reservoir 12 by a capillary or small-diameter return tube 19, while the gas delivered from the container 1 is circulated further through the analytical system.

This gas is first passed through a filter 34, shown in greater detail in Fig. 3, and consisting of two chambers 34a and 34b of relatively large capacity connected by means of a capillary tube 35. The effect of the filter 34 is similar to that of an electrical filter consisting of a resistance connected between two condensers, and results in smoothing down the pressure pulsations due to the working of the pump 7, thus transforming a pulsating flow into a substantially uniform continuous gaseous flow.

The volumes and resistances of the filter should be selected, so far as consistent with the purpose, to have a minimum of volume in order to increase the speed of response of the analysis cell, and a minimum of resistance in order to reduce the strain on the pump.

The gas sample is then passed through a coil 37, immersed in a chamber 38, to which a refrigerating medium, such, for example, as liquid air is supplied by means of pipes 40 and 41. Substantially all hydrocarbons heavier than methane are condensed during their passage through coil 37, and are removed by means of tube 42. They may, if desired, be subsequently vaporized by warming, and analyzed by the same method as the one described below. The separation of the gas samples into components comprising methane and hydrocarbons heavier than methane may also, if desired, be dispensed with by discontinuing the supply of the refrigerating medium to the chamber 38. By suitably controlling the temperature of chamber 38, a separation of the gaseous mixture into fractions consisting of any desired particular hydrocarbon, such, for example, as ethane, propane, etc., or of any mixture thereof is likewise made possible.

The gas sample passing through coil 37 is then directed through chamber 43, filled with a substance, such for example, as ascarite or a caustic alkali, capable of removing from the gas any carbon dioxide which may be naturally present therein.

The gas flowing through chamber 43 enters further a combustion chamber 45, comprising a platinum wire 46 connected to a battery 44, or any other suitable combustion element, which is heated to a desired temperature. By adjusting this temperature by means, for example, of a rheostat 47, and by regulating the rate of flow of the gas through the chamber 45, either a complete, or an incomplete combustion and conversion of hydrocarbons to carbon dioxide may be effected in chamber 45.

The gaseous combustion products are then passed through a flow control device 49, and thence to the analytical chamber 60, the object of the flow control device 49 being to deliver the gas to the analytical chamber at a constant rate of flow independent of variations of pressure which may obtain in the analytical system or any part thereof.

The flow control device 49, shown in greater detail in Fig. 2, comprises a closed cylindrical outer shell 50, to which the gas is admitted by means of the intake pipe 48. An outlet pipe 51 is in communication with an inner cylindrical shell 52, concentric with and sealed into the outer shell 50. A bell-shaped shell 53 is sealed to the inner shell 52 in such a manner as to separate the space within the outer shell 50 into two concentric annular chambers, sealed from each other by a body of mercury (or other suitable liquid) 54 placed in the bottom of the shell 50 in such a manner that the lower rim of the bell 53 is immersed therein. Gaseous communication between said two annular chambers is maintained by means of a capillary orifice or nozzle 55. The bottom opening of the inner cylindrical shell 52, which projects into the outer shell 50 to a level somewhat above that of the lower edge of bell 53, is closed by means of a porous plug or plate 56, such as alundum, which permits a gaseous flow therethrough, but is impervious to mercury.

The operation of the flow-control device is as follows:

The gas is delivered to the annular space between the shells 50 and 53, the resulting increase of pressure causing the mercury level within the bell 53 to rise. The size of the capillary nozzle 55, and the difference of level between the lower face of the plate 56 and the mercury level in shell 50 are adjusted so that the desired rate of gas flow through the nozzle 55, the plate 56 and out through pipe 51 is obtained at a pressure differential between spaces within and without the bell 53 sufficient to maintain the level of the mercury just below the lower face of plate 56. If, under these conditions, the rate of gas inflow to the shell 50 is increased for any reason, the pressure building up in the space outside of bell 53 will cause a further rise of the mercury level within the bell 53. The mercury will thus come into contact with the lower face of the plate 56 and will momentarily stop the outflow of gas through shell 52 and pipe 51. The continuing flow of gas through the capillary nozzle 55 will, however, tend in the next instant to effect an equalization of the pressures within and without the bell 53, thus causing the mercury level to recede from the plate 56. The ensuing gas outflow through said plate and the resulting decrease of pressure within bell 53 will then again cause the mercury level to rise and to stop the gas outflow. This quickly repeating action will, therefore, result in a substantially constant flow of gas through the regulator, the rate of said flow being a function of the flow capacity of the capillary nozzle and of the level difference between the mercury pool in shell 50 and the lower face of the plate 56. The oscillations due to this operation, being in general undesirable for the purpose of this invention, may furthermore be minimized below a perceptible value or entirely eliminated by providing a small and well-centered plate 56 and resistance means for damping the column of mercury, whereby the mercury is caused to find a controlling position which holds the rate of flow at the value predetermined by the size of the orifice 55 and the volume of mercury without apparent oscillation.

The gas sample passing through the flow controller 49 is then delivered to the analytical or reaction cell 60, which may be similar to that disclosed in my Patent No. 2,230,593, granted February 4, 1941, the concentration of the hydrocarbons present in the gas sample being determined by means of the calibrated indicating device 61, as fully explained in said application.

The analytical cell 60 comprises an absorption chamber 60a and an electrode chamber 60b, which are in liquid communication with each other and are filled with an aqueous solution capable of reacting with carbon dioxide to form an insoluble precipitate or a non-ionized reaction product, in such a manner as to give a maximum proportional change in the conductivity of the solution per unit volume of carbon dioxide passed through said solution.

The electrode chamber 60b is provided with two or more electrodes 60c, and means for passing an electric current therebetween through the solution filling said chamber, whereby the electrolytic conductivity of said solution may be measured by means of the indicating device 61.

The gaseous mixture delivered to the analytical cell and comprising the carbon dioxide formed in the combustion chamber 45 is passed through the solution filling said cell. As this highly dissociated or ionized electrolyte solution is gradually converted to a weakly ionized solution of a carbonate having a very low solubility product, the intensity of the current passing between the electrodes 60c is gradually decreased, and the readings taken by means of the indicating device show decreasing values of specific conductivity within the analytical cell.

The gases passing through the analytical cell are then returned to the sample container 1 by means of pipe 62 extending substantially to the bottom of the body of the liquid sample held in said container, and, after passing through said body and washing out a further portion of the hydrocarbons held therein, are again continuously recirculated through the present analytical system.

Since, during this process, the hydrocarbons contained in the liquid of container 1 are continuously converted to carbon dioxide in combustion chamber 45, and the carbon dioxide is then converted to a carbonate in the analytical chamber 60 and thus eliminated from the gaseous phase, the gaseous stream which is returned to the container 1 is capable of washing out further and further quantities of hydrocarbons from the liquid in said container, until finally substantially all the hydrocarbons are separated therefrom and converted to carbonate in cell 60. At this point, the conductivity of the solution in cell 60 and the reading of the indicating device 61 reach and maintain a steady equilibrium value, indicating that the supply of hydrocarbons in container 1 has been exhausted. This steady final value is used to calculate the true concentration of hydrocarbons in the original sample.

It will, therefore, be seen that the present system provides means essential for carrying out a significant analysis of soil gases, and especially of soil gases held in a formation water sample, namely, means for recirculating the gas sample through the system at a uniform rate by pumping means free of moving parts requiring the use of lubricants capable of contaminating the sample, said recirculation resulting in a continuous washing of the water sample by the circulating gas phase under temperature conditions suitable for effecting a substantially complete separation of the water from the hydrocarbons held therein.

I claim as my invention:

1. In a method for analyzing a sample of formation water for the presence therein of extremely small quantities of hydrocarbons, the steps of confining said sample in a closed reservoir partially filled therewith, continuously withdrawing the gaseous phase from the space above the liquid level in said reservoir, passing said gaseous phase through a closed circulatory system while converting the hydrocarbons in said gaseous phase to carbon dioxide by combustion, removing the carbon dioxide from said gaseous phase by passage through an electrolyte capable of reacting therewith to form a carbonate, and determining the amount of the carbon dioxide reacted with said electrolyte by indicating the change in the specific conductivity of said electrolyte, continuously returning the gaseous phase freed from its hydrocarbon content to said reservoir, passing said gaseous phase through the liquid in said reservoir, whereby further hydrocarbons contained in said liquid are caused to pass to said gaseous phase, and continuing the recirculation of said gaseous phase until a complete conversion of said hydrocarbons to carbonates is effected and indicated by the steady value reached by the conductivity of said electrolyte.

2. In a method for analyzing a sample of formation water for the presence therein of extremely small quantities of hydrocarbons, the steps of confining said sample in a closed reservoir partially filled therewith, continuously withdrawing the gaseous phase from the space above the liquid level in said reservoir under controlled pressure and temperature conditions, passing said gaseous phase through a closed circulatory system while converting the hydrocarbons in said gaseous phase to carbon dioxide by combustion, removing the carbon dioxide from said gaseous phase by passage through an electrolyte capable of reacting therewith to form a carbonate, and determining the amount of the carbon dioxide reacted with said electrolyte by indicating the change in the specific conductivity of said electrolyte, continuously returning the gaseous phase freed from its hydrocarbon content to said reservoir, passing said gaseous phase through the liquid in said reservoir, whereby further hydrocarbons contained in said liquid are caused to pass to said gaseous phase, and continuing the recirculation of said gaseous phase until a complete conversion of said hydrocarbons to carbonates is effected and indicated by the steady value reached by the conductivity of said electrolyte.

GERALD L. HASSLER.